(12) United States Patent
Patwardhan (10) Patent No.: US 9,665,306 B1
(45) Date of Patent: May 30, 2017

(54) METHOD AND SYSTEM FOR ENHANCING DATA TRANSFER AT A STORAGE SYSTEM

(71) Applicant: EMC Corporation, Hopkinton, MA (US)

(72) Inventor: Kedar Shrikrishna Patwardhan, Maharashtra (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 572 days.

(21) Appl. No.: 14/132,933

(22) Filed: Dec. 18, 2013

(51) Int. Cl.
*G06F 3/06* (2006.01)

(52) U.S. Cl.
CPC .......... *G06F 3/065* (2013.01); *G06F 3/0604* (2013.01); *G06F 3/0683* (2013.01)

(58) Field of Classification Search
CPC ...... G06F 3/065; G06F 3/0604; G06F 3/0683; G06F 3/06; G06F 3/64; G06F 3/0641
See application file for complete search history.

(56) References Cited

U.S. PATENT DOCUMENTS

| | | | | |
|---|---|---|---|---|
| 6,182,198 B1* | 1/2001 | Hubis | ................. | G06F 11/1466 707/999.202 |
| 7,849,057 B1* | 12/2010 | Kazar | ............... | G06F 17/30088 707/637 |
| 8,234,468 B1* | 7/2012 | Deshmukh | .......... | G06F 11/1453 711/162 |
| 9,111,015 B1* | 8/2015 | Ranade | ............. | G06F 17/30997 |
| 2002/0083037 A1* | 6/2002 | Lewis | ..................... | G06F 11/14 |
| 2007/0079089 A1* | 4/2007 | Ohran | ................. | G06F 11/1451 711/162 |

OTHER PUBLICATIONS

Shim, Hyong, "Method and Apparatus for Reducing Overheads of Primary Storage While Transferring Modified Data", U.S. Appl. No. 13/665,884, filed Oct. 31, 2013, 57 pages.

* cited by examiner

*Primary Examiner* — Farley Abad
(74) *Attorney, Agent, or Firm* — Blakely, Sokoloff, Taylor & Zafman LLP (57) ABSTRACT

A computer-implemented method for enhancing data transfer is disclosed. The method starts with capturing a snapshot of a storage volume and creating a snapshot volume in response to receiving a request for backing up data from the storage volume of a storage system. Upon receiving a write request for writing a new block to a block location of the storage volume while the storage system is performing a backup operation from the snapshot volume to a target storage system, the storage system performs data preservation for the block location only if the block location to be written is not free, otherwise the new block is written to the block location of the storage volume based on the write request without preservation.

20 Claims, 8 Drawing Sheets

METHOD AND SYSTEM FOR ENHANCING DATA TRANSFER AT A STORAGE SYSTEM

FIELD OF THE INVENTION

Embodiments of the present invention relate generally to data storage systems. More particularly, embodiments of the invention relate to enhancing data transfer at a storage device.

BACKGROUND

Data storage is a critical component for computing. In a computing device, there is a storage area in the system to store data for access by the operating system and applications. In a distributed environment, additional data storage may be a separate device that the computing device has access to for regular operations. This kind of data storage is generally referred to as a primary storage, in contrast with a secondary storage, where computing devices also have access to but generally used for backing up. For data protection purposes, it is important to make regular copies of data from a primary storage to a secondary storage. While early backup strategies created complete (full) backups periodically, an alternate technique is to transfer only the incrementally modified data. By stitching together a newly modified data with a previous complete copy on the secondary storage, a new full backup can be reconstructed.

At a primary storage system, the block numbers of a storage volume that are modified (happened to be written to) may be tracked by a bit map, which is referred to as a changed block map. A backup operation reads and just backs up the changed blocked of the storage volume without traversing through a file system to identify changed files. In order to ensure that the backup is also consistent, when a backup request is received at a primary storage system, a snapshot of the storage volume is captured and blocks indicated as modified are read from the snapshot and transmitted from the primary storage system to a secondary storage system (also referred to as a target storage system, the terms secondary storage system, secondary storage, and target storage system are used interchangeably within the specification), while the primary storage system is still receiving further writes from a host. When the primary storage receives write requests from computing devices, it may write the data to the same locations that may be involved in the process of getting backed up to the secondary storage. To ensure the data integrity at such locations, the primary storage may utilize certain extra operations such as copy-on-write to copy the data at a storage location to a corresponding location in the snapshot as part of processing a write request. Such an operation incurs significant overheads and costs degraded performance of backups.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

According to some embodiments, a host is a computing device that is communicatively coupled with a primary storage. Both the host and the primary storage may be communicatively coupled with a backup application server and a secondary storage over a network (e.g., the Internet, a storage network), where the backup application server coordinates backup from the primary storage to the secondary storage. Backup is a process of copying data blocks from one storage system to another storage system. A backup may be a full backup that copies all data blocks from one storage system to another system or an incremental backup that copies only changed portion of the data blocks. Backup may be initiated by the host, the primary storage, the backup application server, or the secondary storage. The backup application server may send a request for a backup of some data blocks to the primary storage. The primary storage then establishes a consistent state of the data blocks (consistent state may also be called point-in-time value, and the two terms are used interchangeably in this specification). In one embodiment, this involves capturing a snapshot of the data blocks to create a snapshot volume. For an incremental backup, the primary storage then identifies the data blocks that have been changed since a previous backup. When a block has changed since the previous backup, it is referred to as a "changed," "modified" or "dirty" block (these terms are used interchangeably in this specification), and needs to be backed up to the secondary storage; other unchanged blocks are referred as "normal" blocks. For a full backup, all the data blocks are considered changed. The blocks from the snapshot volume that are changed are transferred to the secondary storage over the network. During a period of transferring the identified blocks, the primary storage, in response to a storage write (or write, the terms storage write and write are used interchangeably in this specification) from a host to a block location, may preserve the contents in the block location prior to the write.

According to some embodiments, a computer-implemented method can be utilized to enhance data transfer in backing up as discussed herein above. The method starts with capturing a snapshot of a storage volume and creating a snapshot volume in response to receiving a request for backing up data from the storage volume of a storage system. Upon receiving a write request for writing a new block to a block location of the storage volume while the storage system is performing a backup operation from the snapshot volume to a target storage system, the storage system performs data preservation for the block location only if the block location to be written is not free, otherwise the new block is written to the block location of the storage volume based on the write request without preservation. Since host storage writes to block location that is free do not trigger preservation, the backup is more efficient than a system where all host storage writes to blocks trigger preservation.

According to some embodiments, a storage system can be implemented to enhance data transfer. The storage system contains a storage volume configured to contain blocks of data, where a snapshot volume is configured to be created in response to a request for backing up from the storage volume, the snapshot volume capturing a snapshot of the storage volume. The storage system also contains a free space tracker and a snapshot driver. The free space tracker is configured to determine a free space of the storage volume, where the free space of the storage volume does not contain blocks of data. Upon receiving a write request for writing a new block to a block location of the storage volume while performing a backup operation from the snapshot volume to a target storage system, the snapshot driver is configured to perform data preservation for the block location only if the block location to be written is not free as determined by the free space tracker, otherwise the snapshot driver is configured to write the new block to the block location of the storage volume based on the write request without preservation.

Figure 1:
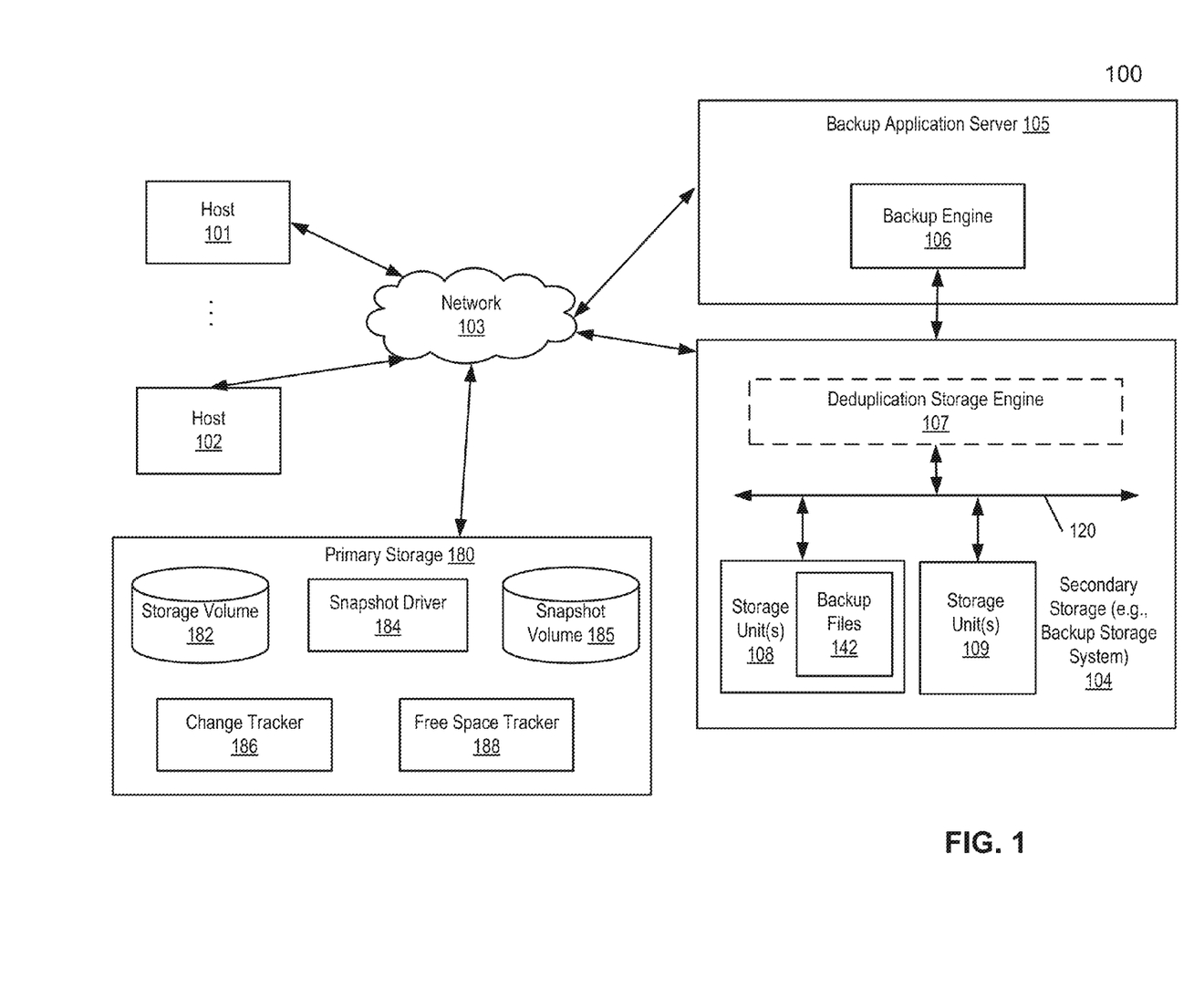
FIG. 1 is a block diagram illustrating a system for backup according to one embodiment of the invention.

FIG. 1 is a block diagram illustrating a system for backup according to one embodiment of the invention. Referring to FIG. 1, system 100 includes, but is not limited to, one or more hosts 101-102 communicatively coupled to primary storage 180 and secondary storage 104 over network 103. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Both primary and secondary storage systems 180 and 104 may include any type of server or cluster of servers. For example, they may be storage servers used for any of various different purposes, such as to provide multiple users with access to shared data and/or to back up mission critical data. They may be, for example, a file server (e.g., an appliance used to provide network attached storage (NAS) capability), a block-based storage server (e.g., used to provide storage area network (SAN) capability), a unified storage device (e.g., one which combines NAS and SAN capabilities), a nearline storage device, a direct attached storage (DAS) device, a tape backup device, or essentially any other type of data storage device. Both primary and secondary storage systems 180 and 104 may have a distributed architecture, or all of their components may be integrated into a single unit. Both primary and secondary storage systems 180 and 104 may be implemented as part of an archive and/or backup storage system such as a de-duplication storage system available from EMC® Corporation of Hopkinton, Mass.

In one embodiment, backup application server 105 includes, but not limited to, a backup engine 106. Backup application server 105 coordinates with backup storage system 104, primary storage 180, and hosts 101-102 to run various backup operations. Backup engine 106 may perform both backup and restore functions. In one embodiment, backup application server 105 coordinates backup and restoration operations between hosts 101/102 and primary storage 180, where the data from hosts 101/102 are backed up to and restored from storage volume 182. In another embodiment, backup application server 105 coordinates backup and restoration operations between primary storage 180 and secondary storage 104, where the data from storage volume 182 of primary storage 180 are backed up to storage units 108-109 at secondary storage 104 (sometimes primary storage 180 and secondary storage 104 are referred to as cascaded storages). Note while backup application server 105 is illustrated as a standalone apparatus in FIG. 1, in some embodiments, backup application server 105 is a module embedded within primary storage 180 or secondary storage 104.

Both primary storage 180 and secondary storage 104 may perform deduplication. The deduplication processes performed and storage units allocated are similar between primary storage 180 and secondary storage 104, thus only the processes and storage units within one of them are disclosed below for illustration. In one embodiment, secondary storage 104 may include, but is not limited to, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID). Backup files 142 represent data stored in storage units 108.

In response to a data file to be stored in storage units 108-109, optional deduplication storage engine 107 is configured to segment the data blocks into multiple segments (also referred to as data chunks or simply chunks) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. The metadata may be stored in at least some of storage units 108-109, such that files can be accessed independent of another storage unit. Metadata of each storage unit includes enough information to provide access to the files it contains.

In one embodiment, the primary and secondary storage as shown in FIG. 1 each may be used as a tier of storage in a storage hierarchy that comprises other tiers of storage. One or more tiers of storage in this hierarchy may utilize different kinds of storage devices and/or may be optimized for different characteristics such as random update performance. Data are periodically moved among the tiers based on data management policies to achieve a cost-effective match to the current storage requirements of the data. For example, data may initially be stored in a tier of storage in a storage volume that offers high performance for reads and writes. As the data ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage, and different purpose (e.g., replication, or backup) for a tiered data storage system.

Referring to FIG. 1, backup engine 106 is configured to back up data from hosts 101-102 and to store the backed up data in one or more of storage units 108 of backup storage system 104, where the data may be deduplicated by deduplication storage engine 107. In this example, a user (e.g., an administrator) initiates a backup request, directly or through a backup schedule, of primary storage 180. Note in some embodiments, the user may request a full backup or an incremental backup, and primary storage 180 decides whether full storage volume 182 or changed data within storage volume 182 only are transferred (e.g., primary storage 180 may decide to transfer changed data only when the secondary storage has an earlier backup of the data and only changed data are needed to fully reconstruct the data at the secondary storage).

Primary storage 180 contains storage volume 182, which represents the data stored in the primary storage. Storage volume 182 may store data across a number of logical units, and each identified by a logical unit number (LUN). Each logical unit may contain a number of blocks, and each block may contain a number of sectors. Primary storage 180 also contains snapshot driver 184 that manages both backup and restore processes within primary storage 180. Snapshot volume 185 is created for backup processes and data blocks in snapshot volume 185 are transferred to secondary storage 104 at request. Primary storage 180 also contains change tracker 186 to track changes of data within the primary storage. In one embodiment, the changes tracked are the changes of data block from a previous backup. Primary storage 180 may also include free space tracker 188 that records the locations that currently store no data within in storage volume 182.

Figure 2:
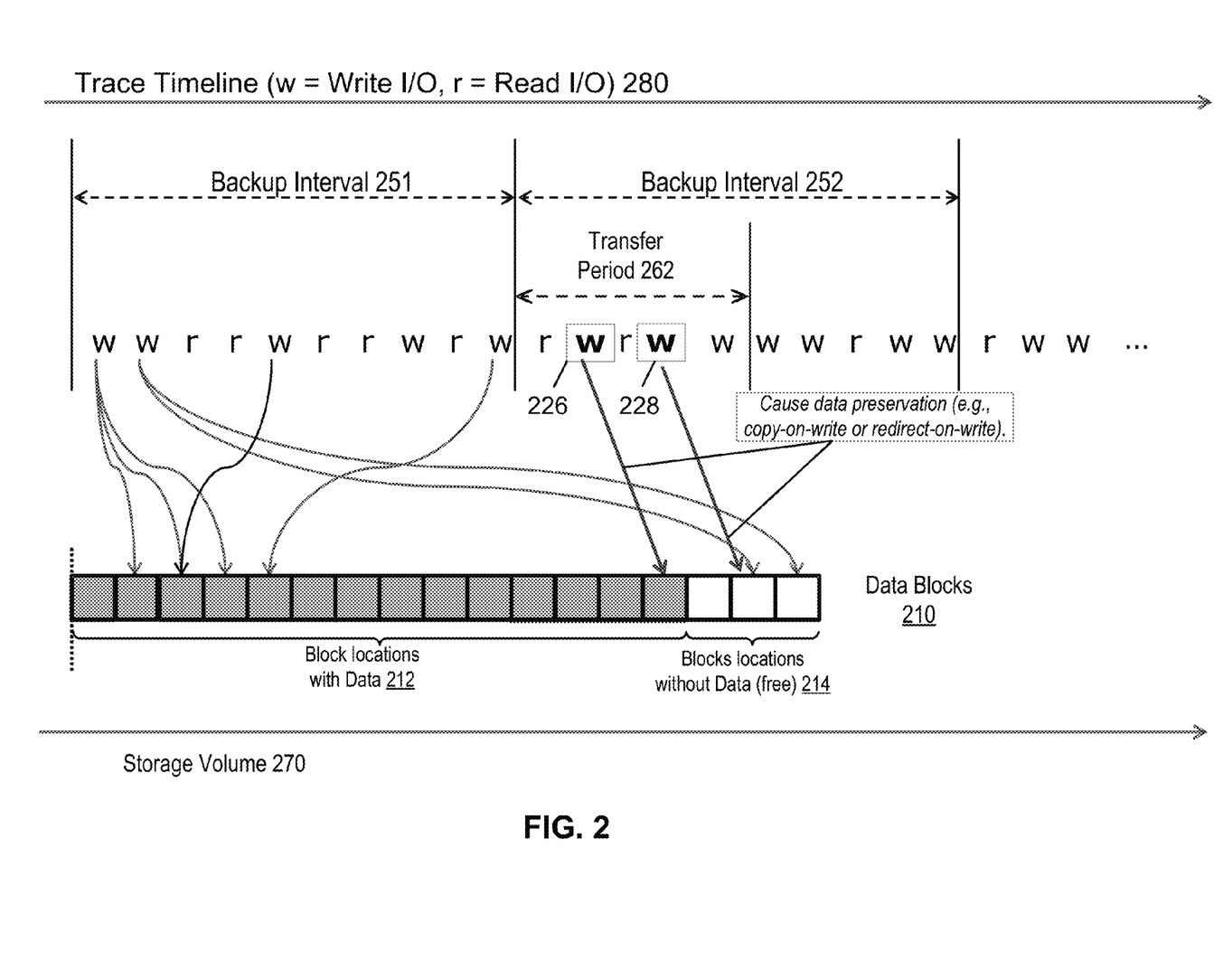
FIG. 2 is a block diagram illustrating data content preservation during a backup process.

FIG. 2 is a block diagram illustrating data content preservation during a backup process. Trace timeline 280 illustrates timeline of backups such as storage volume 182 of primary storage 180 to a secondary storage (e.g., backup storage system) 104 of FIG. 1. As shown, backups are periodically performed, and backup intervals 251 and 252 are two examples. Note backup intervals 251 and 252 do not need to be equal and backup intervals may change from time to time. A backup request triggered data transfer starts at the beginning of a backup interval and ends when the requested data have been transmitted from a primary storage to a backup storage system. Transfer period 262 illustrates the duration of a transfer period for blocks changed during backup interval 251. Transfer period 262 is shorter than backup interval 252 so that data transfer can be completed within a backup interval.

As primary storage 180 is online during backup intervals, a list of write and read operations to primary storage 180 is shown, where a "w" represents a write input/output (I/O) operation and an "r" represents a read I/O operation by a host (e.g., host 102 in FIG. 1). While FIG. 2 shows that "w" and "r" occur at a roughly equal interval, this is for simplicity of illustration. Read I/O and write I/O may occur at a non-even pace. A write affects one or more consecutive sectors that may span one or more blocks. FIG. 2 shows blocks 210 of storage volume 270. Block locations at reference 212 contain data while block locations at reference 214 do not contain data (thus referred to as free space). Note "w" at reference 226 writes to a block location containing data while "w" at reference 228 writes to a block location that is free. Yet both writes at references 226 and 228 may trigger data preservation process. The agnostic data preservation causes transfer overheads that are more than necessary and embodiments of this invention will address the issue as discussed herein below.

Copy-on-write is one way of preserving data so that the data integrity of the blocks to be transferred can be maintained during a concurrent read and write operation. For block transfer, a snapshot of the identified changed blocks is captured in a snapshot volume to obtain a consistent state of the blocks. The snapshot of the identified changed blocks is then transferred from the primary storage to the secondary storage. With copy-on-write during data transfer, a write of a block to a block location from a host triggers a copy of the data presently stored in the block location to a different location (e.g., at a snapshot space of the snapshot volume) so that the write at the original location does not affect the transferred data. For example, referring to FIG. 2, upon the write I/O at reference 226, the data stored in the block location is copied to a new block in the snapshot volume first and then the new data of write I/O at reference 226 is written to the block location.

Another way to preserve data integrity during data transfer is redirect-on-write, where a write of a data block is appended to a log or some other alternate location (e.g., in the snapshot volume) instead of writing to the original location of the data block. Redirect-on-write causes the new data block to be written in the alternate location while copy-on-write causes the old content in the block location to be written to the snapshot volume and the new content is written to the same location of the old content. Both copy-on-write and redirect-on-write take an extra write I/O, and they take storage spaces and affect the performance characteristics of the primary storage. In this example, while it is understandable that write at reference 226 triggers data preservation as the write happens to a block position presently stored data, write at reference 228 should not need to trigger data preservation as the block location contains no data. Note while copy-on-write and redirect-on-write are illustrated as two examples of data preservation, other techniques to preserve data consistency upon receiving a write request may be utilized, and they may be utilized in conjunction with embodiments of the invention to enhance data transfer performance.

Figure 3:
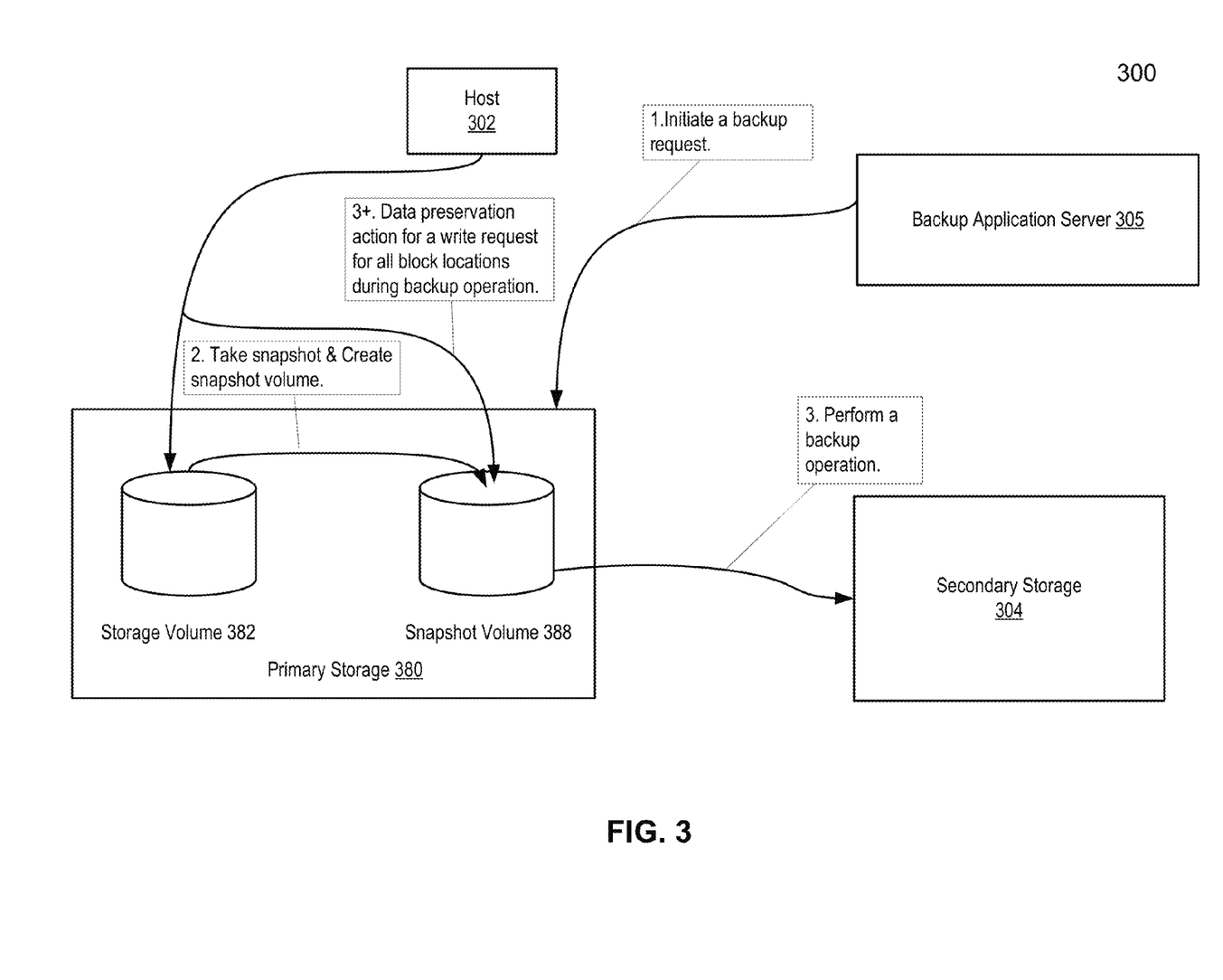
FIG. 3 is a block diagram illustrating a backup process with agnostic data preservation.

FIG. 3 is a block diagram illustrating a backup process with agnostic data preservation. Task boxes 1 to 3/3+ illustrate the order in which operations are performed according to one embodiment of the invention. System 300 is similar to system 100 in FIG. 1 and the same or similar references indicate elements or components having the same or similar functionalities. The connectivity between various entities and modules within entities are omitted in FIG. 3 to leave space to discuss the incremental backup process more clearly. The process starts at backup application server 305 with a request for a backup of host 302 at task box 1. The backup request may be for an incremental backup in some embodiment, and the backup request may be for a full backup in another embodiment. Primary storage 380 receives the request. In one embodiment, the request comes from a user directly through a user interface. In another embodiment, the request comes from secondary storage 304 or primary storage 380 itself based on a backup schedule. After receiving the request, primary storage 380 decides to initiate an incremental backup. Primary storage 380 may decide to initiate an incremental backup even if the backup request does not explicitly requests so for transfer efficiency purposes. At task box 2, a snapshot is captured (e.g., through snapshot driver 184) to establish a consistent state of storage volume 382 within primary storage 380. The resulting snapshot is saved at snapshot volume 388.

At task box 3, backup operation is performed. In one embodiment, changed blocks within the snapshot volume 388 are identified and then transferred. In some embodiments, identifying changed blocks is not a separate process; rather, it is a part of a process host write requests by the primary storage. In other words, identification of changed blocks may happen prior to or concurrently with a backup request being received at primary storage 380. Changed blocks need to be transferred to secondary storage 304. The identification of changed block may be achieved through a variety of ways. For example, a variety of data structures such as a bit vector or a table (e.g., hash table, tree, or array) may be used to track dirty blocks within primary storage 380. A change tracker like change tracker 186 may be used to store the status of blocks within primary storage 380 by implementing the aforementioned variety of data structures.

After backup operation starts and before backup operation completes, host 302 may continue writing to primary storage 380. Since the write happens after backup operation starts at task box 3, "3+" is used to denote the timeline difference. At task box 3+, a write request to a block location triggers a data content preservation action, regardless whether the block location needs content preservation or not.

Figure 4:
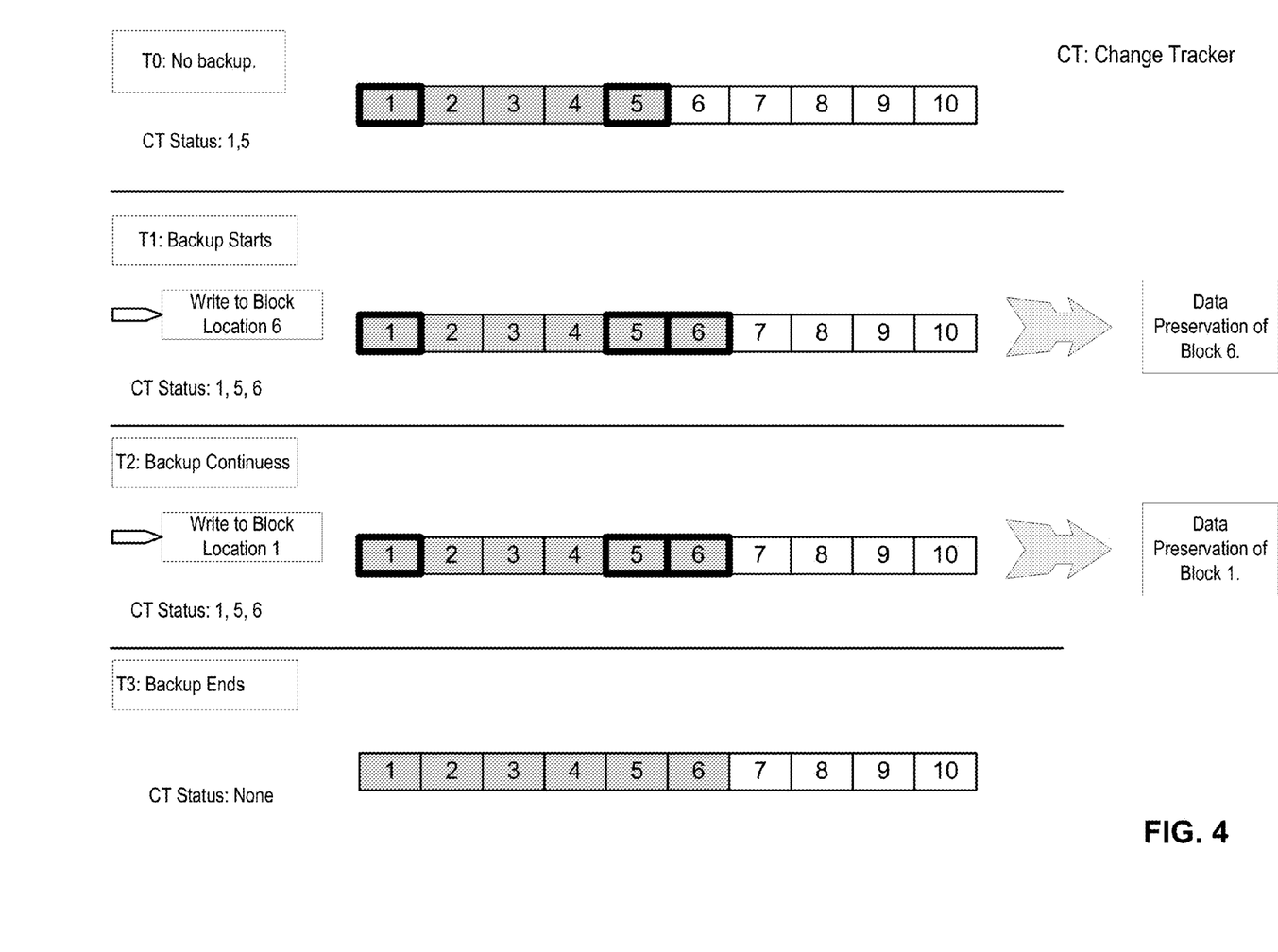
FIG. 4 is another block diagram illustrating a backup process with agnostic data preservation.

FIG. 4 is another block diagram illustrating a backup process with agnostic data preservation. FIG. 4 focuses on illustrating changes of block status with regard to block location being occupied and block value being changed. The storage volume contains ten block locations, numbered 1 to 10. At time T0, the system is not in the middle of backup. Change tracker records that blocks 1 and 5 have been changed since last backup (block locations 1 and 5 are marked with heavy-lined box to denote the marked change). Block locations 1 to 5 stores data and block locations 6-10 are free space. The block locations storing data have been grayed out to indicate the block location contains data.

At time T1, a host requests a write to block location 6. Since data preservation is agnostic, data preservation process is performed, even though block 6 was free space without storing any data. The change tracker status is updated to indicate that block 1, 5, and 6 have been changed. The data preservation process such as copy-on-write or redirect-on-write is performed. At time T2, a host requests a write to block location 1. The data preservation process is performed again. The change tracker status is unchanged, as block 1 has been changed earlier. At time T3, backup operation is complete, and the change tracker is reset as all the changed blocks have been transferred to a target storage.

Note only changed blocks are backed up in the process, and change tracker is used to determine what block has changed. The backup process always performs data preservation for any write to during the backup process to preserve data consistency, even though data preservation is not necessary (e.g., data preservation for block 6).

Figure 5:
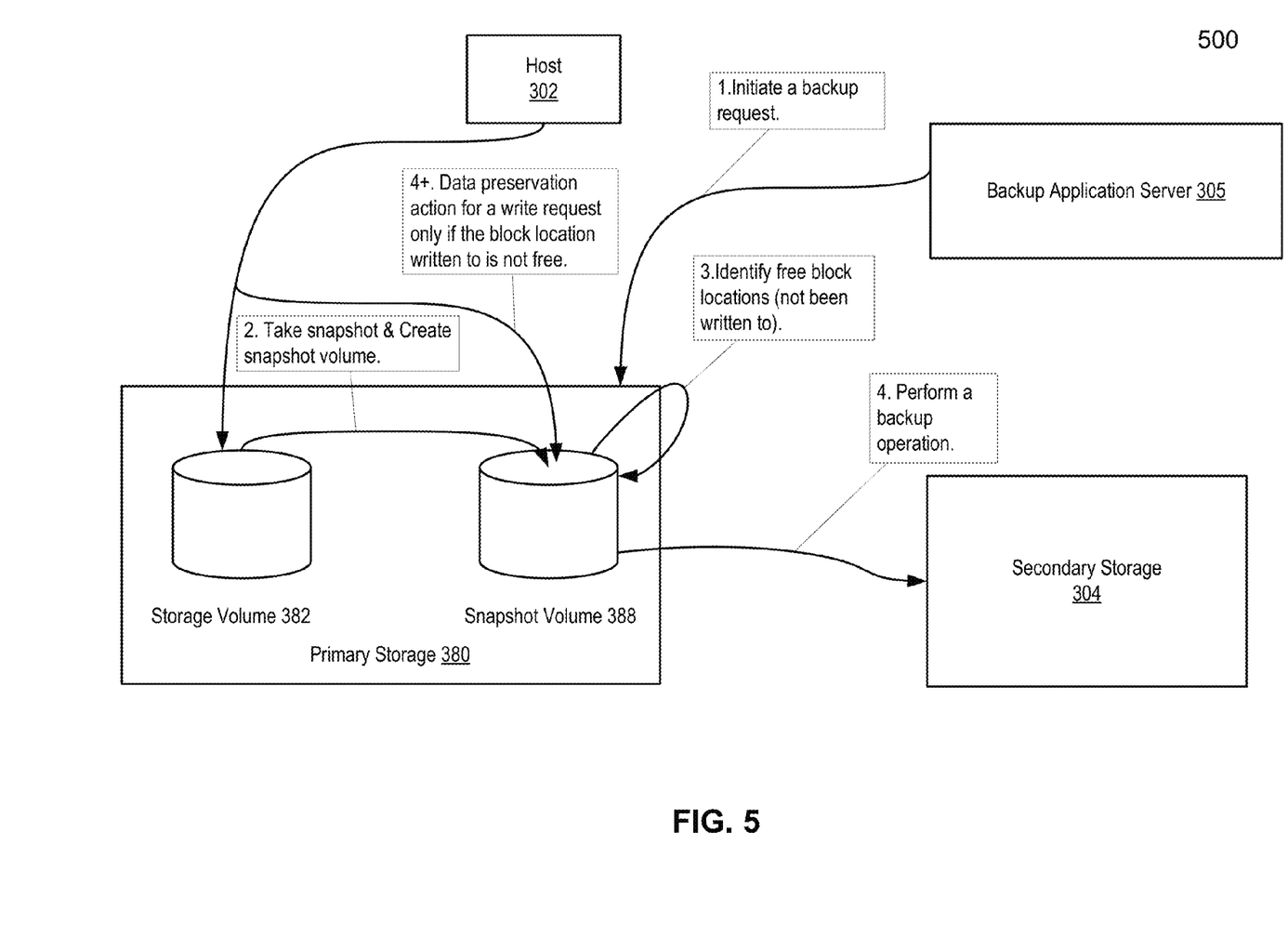
FIG. 5 is a block diagram illustrating an enhanced backup process with targeted data preservation according to one embodiment of the invention.

FIG. 5 is a block diagram illustrating an enhanced backup process with targeted data preservation according to one embodiment of the invention. Task boxes 1 to 4/4+ illustrate the order in which operations are performed according to one embodiment of the invention. System 500 is similar to system 100 in FIG. 1 and the same or similar references indicate elements or components having the same or similar functionalities. The connectivity between various entities and modules within entities are omitted in FIG. 5 to leave space to discuss the incremental backup process more clearly. The process starts at backup application server 305 with a request for a backup of host 302. The backup request may be for an incremental backup in some embodiment, and the backup request may be for a full backup in another embodiment. Primary storage 380 receives the request. In one embodiment, the request comes from a user directly through a user interface. In another embodiment, the request comes from secondary storage system 304 or primary storage 380 itself based on a backup schedule. After receiving the request, primary storage 380 decides to initiate an incremental backup (for example, through data protection logic 184 of FIG. 1). Primary storage may decide to initiate an incremental backup even if the backup request does not explicitly requests so for transfer efficiency purposes. At task box 2, a snapshot is captured (e.g., through snapshot driver 184) to establish a consistent state of storage volume 382 within primary storage 380. The resulting snapshot is saved at snapshot volume 388.

At task box 3, primary storage 380 identifies free block locations, i.e., the block locations not storing data. The identification may through free space tracker 188 in one embodiment. The identification can be performed on many file systems through a command or an application programming interface (API). For example, an ncheck on UNIX or Windows® API may read free space in a storage volume. The free space tracker may be implemented as a free space bitmap in one embodiment. The free space bitmap may be communicated to a snapshot driver such as snapshot driver 184 through a system call such as an ioctl (short for input/output control).

At task box 4, backup operation is performed. The backup operation is similar to the one discussed herein above with regard to the backup operation performed at task box 3 in FIG. 3. Also similar to FIG. 3, after backup operation starts and before it completes, host 302 may continue writing to primary storage 380. At task box 4+, a write request to a block location triggers a data content preservation action only if the block location to be written is not free per determined in task box 3. Otherwise a writing is performed to the block location based on the write request without preservation action.

Figure 6:
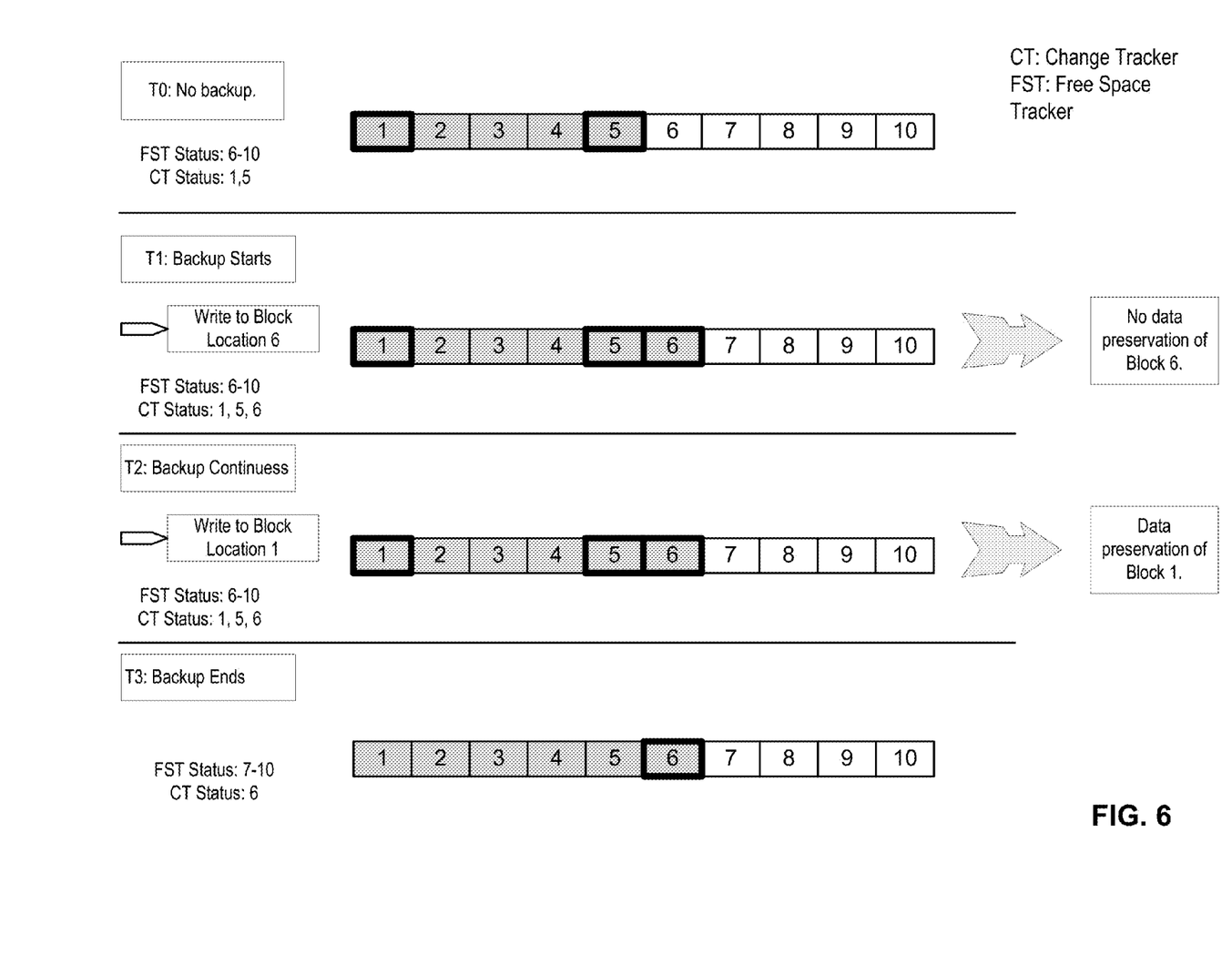
FIG. 6 is another block diagram illustrating an enhanced backup process with targeted data preservation according to one embodiment of the invention.

FIG. 6 is another block diagram illustrating an enhanced backup process with targeted data preservation according to one embodiment of the invention. FIG. 6 focuses on illustrating changes of block status with regard to block location being occupied and block value being changed. FIG. 6 is similar to FIG. 4, and the same or similar references indicate element or components having the same or similar functionalities.

One difference is that a free space tracker now tracks free space within the storage volume. At time T0, the change tracker records that blocks 1 and 5 have been changed since last backup while free space tracker records that block location 6-10 are free space. At T1, a host requests a write to block location 6. Since the block location has been free as indicated by the free space tracker, no data preservation process such as copy-on-write or redirect-on-write is performed for the write request. A new data from the write request is written to block location 6. Note the free space tracker is not updated even though now the new write has made the block location no longer free. The free space tracker will not be updated until the backup operation completes. At time T2, a host requests a write to block location 1. Since the free space tracker indicates that the block location has not been free, a data preservation process is performed to preserve the data currently stored in the block location. At time T3, backup operation is complete. Since block location 6 has not been backed up, the change tracker will show that block 6 has been changed. The free space tracker is updated to indicate that free space location is block locations 7-10.

Note backup operations are performed for the block locations that are both changed and not free space as determined by the change tracker and the free space tracker respectively. Thus backup operations are less, and it performs less data preservation operations such as copy-on-write or redirect-on-write. Some file systems such as new technology file system (NTFS), B-tree file system, Zettabyte file system (ZFS), and Write Anywhere File Layout (WAFL) file system do not overwrite an existing block with data and they allocate new blocks for file writing I/O. Writes caused by these do not trigger data preservation operations during a backup operation as the free space tracker identifies the new block locations as free space. Thus performing blocked based backup is more efficient with the embodiments of the invention.

Figure 7:
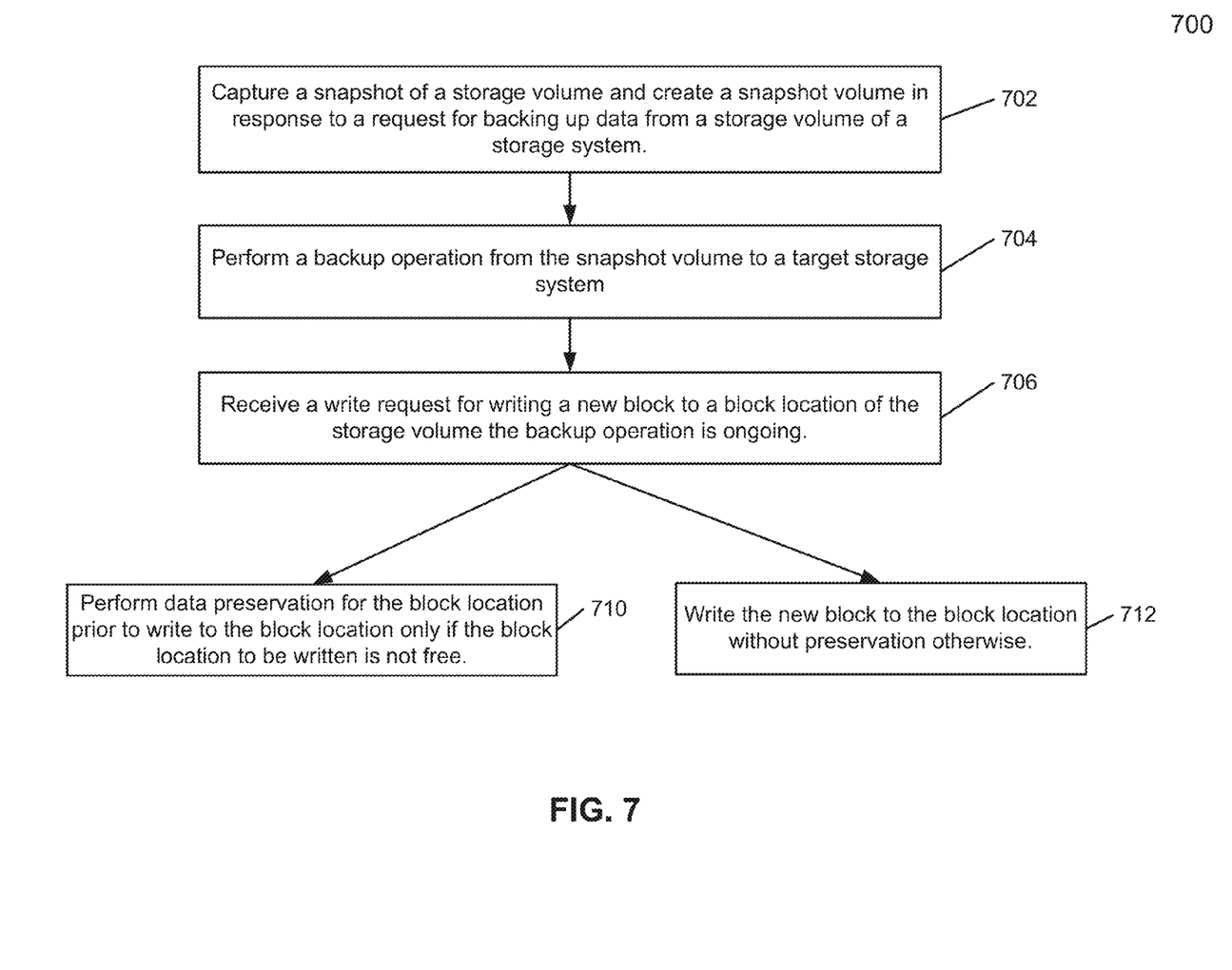
FIG. 7 is a flow diagram illustrating an enhanced backup process with targeted data preservation according to one embodiment of the invention.

FIG. 7 is a flow diagram illustrating an enhanced backup process with targeted data preservation according to one embodiment of the invention. Method 700 can be performed at primary storage 180 or secondary storage 104 when the secondary storage needs to backup in a tiered storage system.

Method 700 starts with reference 702, where in response to a request for backing up data from a storage volume of a storage system, the storage system captures a snapshot of the storage volume and creates a snapshot volume. In one embodiment, a snapshot driver such as snapshot driver 184 of FIG. 1 performs the operation. At reference 704, the storage system performs a backup operation to back up data from the snapshot volume to a target storage system. Then at reference 706, the storage system receives a write request for writing a new block to a block location of the storage volume while performing the backup operation from the snapshot volume to the target storage system is ongoing. If the block location is not free, the flow goes to reference 710, where the storage system performs data preservation for the block location prior to writing the new block to the block location. Otherwise if the block location is free, the flow goes to reference 712, where the new block is written to the block location without preservation.

The block location being free or not is determined based on a bitmap for free space tracking free space of the storage volume in one embodiment. In one embodiment, only the blocks that have been changed from a previous backup is backed up. The blocked being changed or not is tracked by another bitmap for block change in one embodiment, and a write to a block location triggers the block location being marked as changed.

The data preservation operations at reference 710 may be copy-on-write, which includes reading data from the block location, writing the data to another block location, and then marking the to-be-written location as being copied. The data preservation operations at reference 710 may also be a redirect-on-write, which includes writing the data to another block location, and marking the to-be-written location as being redirected.

Figure 8:
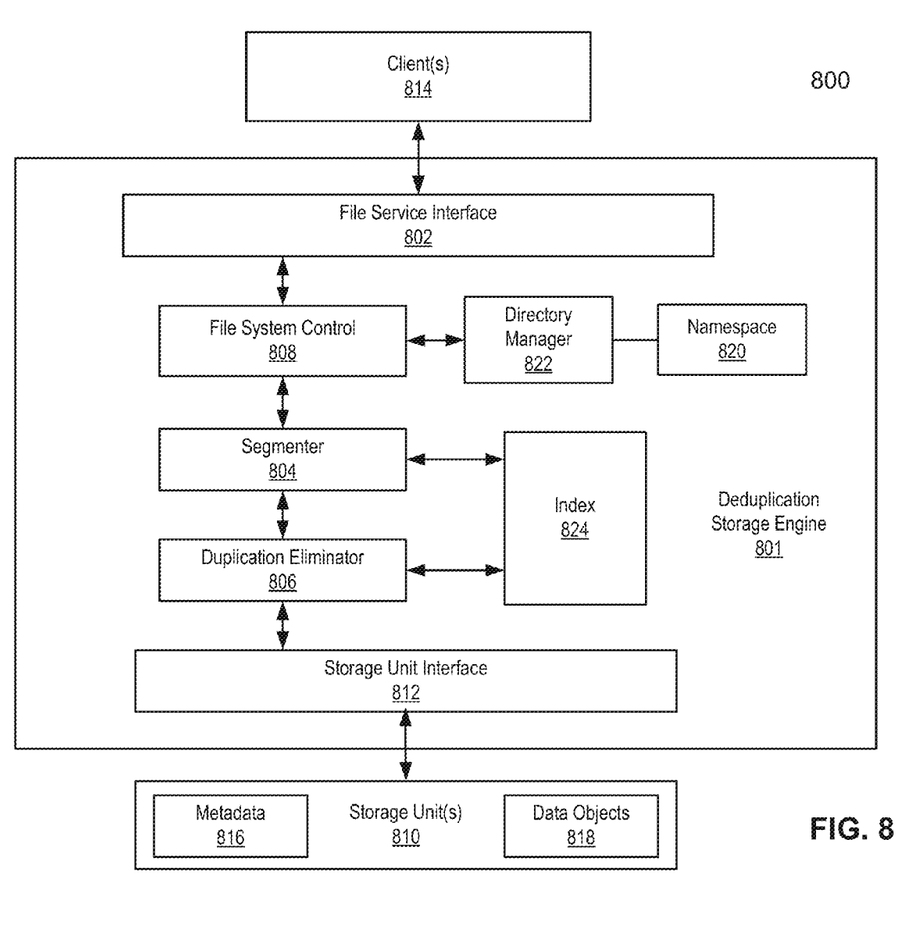
FIG. 8 is a block diagram illustrating a deduplicated storage system according to one embodiment of the invention.

As discussed herein above, data backup/transfer may be integrated with deduplication and both primary storage 180 and secondary storage 104 implementing embodiments of the invention may be deduplicated storage systems. FIG. 8 is a block diagram illustrating a deduplication storage system according to one embodiment of the invention. For example, deduplication storage system 800 may be implemented as part of a deduplication storage system as described above, such as, for example, the deduplication storage system as a client and/or a server as shown in FIG. 1. In one embodiment, storage system 800 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 800 may have a distributed architecture, or all of its components may be integrated into a single unit. Storage system 800 may be implemented as part of an archive and/or backup system such as a deduplicating storage system available from EMC® Corporation of Hopkinton, Mass.

In one embodiment, storage system 800 includes a deduplication engine 801 interfacing one or more clients 814 with one or more storage units 810 storing metadata 816 and data objects 818. Clients 814 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 810 may be implemented locally (e.g., single node operating environment) or remotely (e.g., multi-node operating environment) via an interconnect, which may be a bus and/or a network (e.g., a storage network). In one embodiment, one of storage units 810 operates as an active storage to receive and store external or fresh user data from a client (e.g., an end-user client or a primary storage system associated with one or more end-user clients), while the another one of storage units 810 operates as a target storage unit to periodically archive data from the active storage unit according to an archiving policy or scheme. Storage units 810 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 810 may also be combinations of such devices. In the case of disk storage media, the storage units 810 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 816, may be stored in at least some of storage units 810, such that files can be accessed independent of another storage unit. Metadata of each storage unit includes enough information to provide access to the files it contains. In one embodiment, metadata may include fingerprints contained within data objects 818, where a data object may represent a data chunk, a compression region (CR) of one or more data chunks, or a container of one or more CRs. Fingerprints are mapped to a particular data object via metadata 816, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 816 may include a file name, a storage unit identifier (ID) identifying a storage unit in which the chunks associated with the file name are stored, reconstruction information for the file using the chunks, and any other appropriate metadata information. Metadata 816 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk, one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 801 includes file service interface 802, segmenter 804, duplicate eliminator 806, file system control 808, and storage unit interface 812. Deduplication storage engine 801 receives a file or files (or data item(s)) via file service interface 802, which may be part of a file system namespace 820 of a file system associated with the deduplication storage engine 801. The file system namespace 820 refers to the way files are identified and organized in the system. An example is to organize the files hierarchically into directories or folders, which may be managed by directory manager 822. File service interface 812 supports a variety of protocols, including a network file system (NFS), a common Internet file system (CIFS), and a virtual tape library interface (VTL), etc.

The file(s) is/are processed by segmenter 804 and file system control 808. Segmenter 804, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based—for example, a hash function is applied to values of data within a sliding window through the data stream or block and when the hash function is equal to a value (or equal to one of several values) then a chunk boundary is identified. In various embodiments, chunk boundaries are identified using content-based functions operating on windows within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, file system control 808, also referred to as a file system manager, processes information to indicate the chunk(s) association with a file. In some embodiments, a list of fingerprints is used to indicate chunk(s) associated with a file. File system control 808 passes chunk association information (e.g., representative data such as a fingerprint) to index 824. Index 824 is used to locate stored chunks in storage units 810 via storage unit interface 812. Duplicate eliminator 806, also referred to as a segment store, identifies whether a newly received chunk has already been stored in storage units 810. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 810 that make up the file. Chunks are then packed by a container manager (which may be implemented as part of storage unit interface 812) into one or more storage containers stored in storage units 810. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 802 is configured to communicate with file system control 808 to identify appropriate chunks stored in storage units 810 via storage unit interface 812. Storage unit interface 812 may be implemented as part of a container manager. File system control 808 communicates (e.g., via segmenter 804) with index 824 to locate appropriate chunks stored in storage units via storage unit interface 812. Appropriate chunks are retrieved from the associated containers via the container manager and are used to construct the requested file. The file is provided via interface 802 in response to the request. In one embodiment, file system control 808 utilizes a tree (e.g., a chunk tree obtained from namespace 820) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 801 may be implemented in software (e.g., executable code executed in a memory by a processor), hardware (e.g., processor(s)), or a combination thereof. For example, deduplication engine 801 may be implemented in a form of executable instructions that can be stored in a machine-readable storage medium, where the instructions can be executed in a memory by a processor.

In one embodiment, storage system 800 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method comprising:
   in response to a request for backing up data from a storage volume of a storage system, capturing a snapshot of the storage volume, creating a snapshot volume;
   determining a free space of the storage volume, wherein the free space of the storage volume does not contain blocks of data;
   upon receiving a write request for writing a new block to a first block location of the storage volume while performing a backup operation from the snapshot volume to a target storage system,
   performing data preservation for the first block location prior to writing the new block only if the first block location to be written is not free based on the determination of the free space of the storage volume; and
   writing the new block to the first block location of the storage volume based on the write request without preservation if the first block location to be written is free based on the determination of the free space of the storage volume.

2. The computer-implemented method of claim 1, wherein performing data preservation for the first block location comprises:
   reading data from first block location;
   writing the data to a second block location; and
   marking the first block location as being copied.

3. The computer-implemented method of claim 1, wherein performing data preservation for the first block location comprises:
   writing the data to a second block location; and
   marking the first block location as being redirected.

4. The computer-implemented method of claim 1, wherein determining the first block location being free is based on a bitmap for free space tracking the free space of the storage volume.

5. The computer-implemented method of claim 1, further comprising:
   marking the first block location as being changed.

6. The computer-implemented method of claim 5, wherein marking the block as being changed is through marking a bitmap for block changing tracking changes of the blocks of data of the storage volume.

7. The computer-implemented method of claim 1, wherein the storage system is a deduplicating storage system.

8. A storage system, comprising:
   a storage volume configured to contain blocks of data, wherein a snapshot volume is configured to be created in response to a request for backing up from the storage volume, the snapshot volume capturing a snapshot of the storage volume;
   a free space tracker configured to determine a free space of the storage volume, wherein the free space of the storage volume does not contain blocks of data; and
   upon receiving a write request for writing a new block to a first block location of the storage volume while performing a backup operation from the snapshot volume to a target storage system,
   a snapshot driver configured to perform data preservation for the first block location prior to writing the new block only if the first block location to be written is not free as determined by the free space tracker,
   the snapshot driver configured to write the new block to the first block location of the storage volume based on the write request without preservation if the first block location to be written is free as determined by the free space tracker.

9. The storage system of claim 8, wherein performing data preservation for the first block location comprises:
   reading data from the first block location;
   writing the data to a second block location; and
   marking the first block location as being copied.

10. The storage system of claim 8, wherein performing data preservation for the first block location comprises:
    writing data to a second block location; and
    marking the first block location as being redirected.

11. The storage system of claim 8, wherein the free space tracker determines the free space of a storage volume based on reading a bitmap for free space tracking the first space of the storage volume.

12. The storage system of claim 8, further comprising a change tracker configured to mark the first block location as being changed.

13. The storage system of claim 8, wherein the storage system is a deduplicating storage system.

14. A non-transitory computer-readable medium having instructions stored therein, which when executed by a processor, cause the processor to perform operations, the operations comprising:
    in response to a request for backing up data from a storage volume of a storage system, capturing a snapshot of the storage volume, creating a snapshot volume;
    determining a free space of the storage volume, wherein the free space of the storage volume does not contain blocks of data;
    upon receiving a write request for writing a new block to a first block location of the storage volume while performing a backup operation from the snapshot volume to a target storage system,
    performing data preservation for the first block location prior to writing the new block only if the first block location to be written is not free based on the determination of the free space of the storage volume; and
    writing the new block to the first block location of the storage volume based on the write request without preservation if the first block location to be written is free based on the determination of the free space of the storage volume.

15. The non-transitory computer-readable medium of claim 14, wherein performing data preservation for the first block location comprises:
    reading data from first block location;
    writing the data to a second block location; and
    marking the first block location as being copied.

16. The non-transitory computer-readable medium of claim 14, wherein performing data preservation for the first block location comprises:
    writing the data to a second block location; and
    marking the first block location as being redirected.

17. The non-transitory computer-readable medium of claim 14, wherein determining the first block location being free is based on a bitmap for free space tracking free space of the storage volume.

18. The non-transitory computer-readable medium of claim 14, wherein the operations further comprises:
    marking the first block location as being changed.

19. The non-transitory computer-readable medium of claim 18, wherein marking the block as being changed is through marking a bitmap for block changing tracking changes of the blocks of data of the storage volume.

20. The non-transitory computer-readable medium of claim 14, wherein the storage system is a deduplicating storage system.

* * * * *